US009930676B2

United States Patent
Sorrentino et al.

(10) Patent No.: US 9,930,676 B2
(45) Date of Patent: Mar. 27, 2018

(54) RECEIVING DEVICE AND METHOD PERFORMED THEREIN FOR COMMUNICATING IN A WIRELESS COMMUNICATION NETWORK

(71) Applicant: Telefonaktiebolaget L M Ericsson (publ), Stockholm (SE)

(72) Inventors: Stefano Sorrentino, Solna (SE); Ali Zaidi, Järfälla (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 143 days.

(21) Appl. No.: 14/909,896

(22) PCT Filed: Nov. 6, 2015

(86) PCT No.: PCT/SE2015/051178
§ 371 (c)(1),
(2) Date: Feb. 3, 2016

(87) PCT Pub. No.: WO2017/078585
PCT Pub. Date: May 11, 2017

(65) Prior Publication Data
US 2017/0265198 A1    Sep. 14, 2017

(51) Int. Cl.
*H04W 4/00* (2009.01)
*H04W 72/06* (2009.01)
(Continued)

(52) U.S. Cl.
CPC .......... *H04W 72/06* (2013.01); *H04L 5/0085* (2013.01); *H04W 72/1263* (2013.01); *H04W 72/1289* (2013.01); *H04L 67/12* (2013.01)

(58) Field of Classification Search
CPC ............. H04W 72/06; H04W 72/1263; H04W 72/1268; H04W 72/1273; H04W 72/1284;
(Continued)

(56) References Cited

U.S. PATENT DOCUMENTS

2005/0030953 A1* 2/2005 Vasudevan .............. H04L 47/10
370/395.4
2007/0177536 A1* 8/2007 Brueck ............. H04W 72/1268
370/328

(Continued)

FOREIGN PATENT DOCUMENTS

| WO | 2014015101 A1 | 1/2014 |
| WO | 2015021185 A1 | 2/2015 |
| WO | 2015115945 A1 | 8/2015 |

OTHER PUBLICATIONS

Unknown Author, "Control design for D2D broadcast communication", 3GPP TSG RAN WG1 Meeting #76bis R1-141349 Shenzhen, China, Mar. 31-Apr. 4, 2014 Source: LG Electronics, Mar. 31-Apr. 4, 2014, 1-6.

(Continued)

*Primary Examiner* — Kevin Mew
(74) *Attorney, Agent, or Firm* — Murphy, Bilak & Homiller PLLC

(57) ABSTRACT

Embodiments herein relate to a receiving device (11) and a method performed by the receiving device (11) performed by a receiving device (11) for communicating in a wireless communication network (1). The receiving device 11 attempts to detect a scheduling assignment from a transmitting device (10) based on information regarding one or more radio resources previously used by the transmitting device (10) for transmitting data to the receiving device (11) within the wireless communication network (1). When not detecting the scheduling assignment from the transmitting device (10), the receiving device (11) assumes that a transmission of data from the transmitting device (10) is scheduled on the one or more radio resources previously used by the transmitting device (10). The receiving device communicates within the wireless communication network (1) based on the assumption.

25 Claims, 7 Drawing Sheets

(51) Int. Cl.
  *H04W 72/12* (2009.01)
  *H04L 5/00* (2006.01)
  *H04L 29/08* (2006.01)
(58) Field of Classification Search
  CPC .......... H04W 72/1289; H04W 72/1294; H04L 5/0085; H04L 67/12
  See application file for complete search history.

(56) References Cited

U.S. PATENT DOCUMENTS

| | | | |
|---|---|---|---|
| 2007/0189197 A1* | 8/2007 | Kwon | H04W 72/06 370/319 |
| 2010/0099429 A1* | 4/2010 | Ishii | H04W 72/1268 455/452.1 |
| 2010/0202288 A1* | 8/2010 | Park | H04W 48/08 370/230 |
| 2012/0069805 A1* | 3/2012 | Feuersanger | H04W 72/1284 370/329 |
| 2012/0076126 A1* | 3/2012 | Yi | H04L 5/001 370/338 |
| 2012/0300616 A1* | 11/2012 | Zeng | H04W 72/1289 370/216 |
| 2013/0322413 A1* | 12/2013 | Pelletier | H04W 72/1289 370/336 |
| 2014/0328260 A1* | 11/2014 | Papasakellariou | H04W 72/1289 370/329 |
| 2015/0049681 A1* | 2/2015 | Huang | H04W 72/1289 370/329 |
| 2015/0078306 A1* | 3/2015 | Meyer | H04L 1/1812 370/329 |
| 2016/0088617 A1* | 3/2016 | Goldhamer | H04L 1/18 370/330 |
| 2016/0278009 A1* | 9/2016 | Sorrentino | H04W 72/02 |
| 2017/0041942 A1* | 2/2017 | Wallentin | H04W 72/1231 |

OTHER PUBLICATIONS

Unknown Author, "Operation in Mode 2 resource allocation for D2D communication", 3GPP TSG RAN WG1 Meeting #76bis R1-141350 Shenzen, China, Mar. 31-Apr. 4, 2014 Source LG Electronics, Mar. 31-Apr. 4, 2014, 1-8.

* cited by examiner

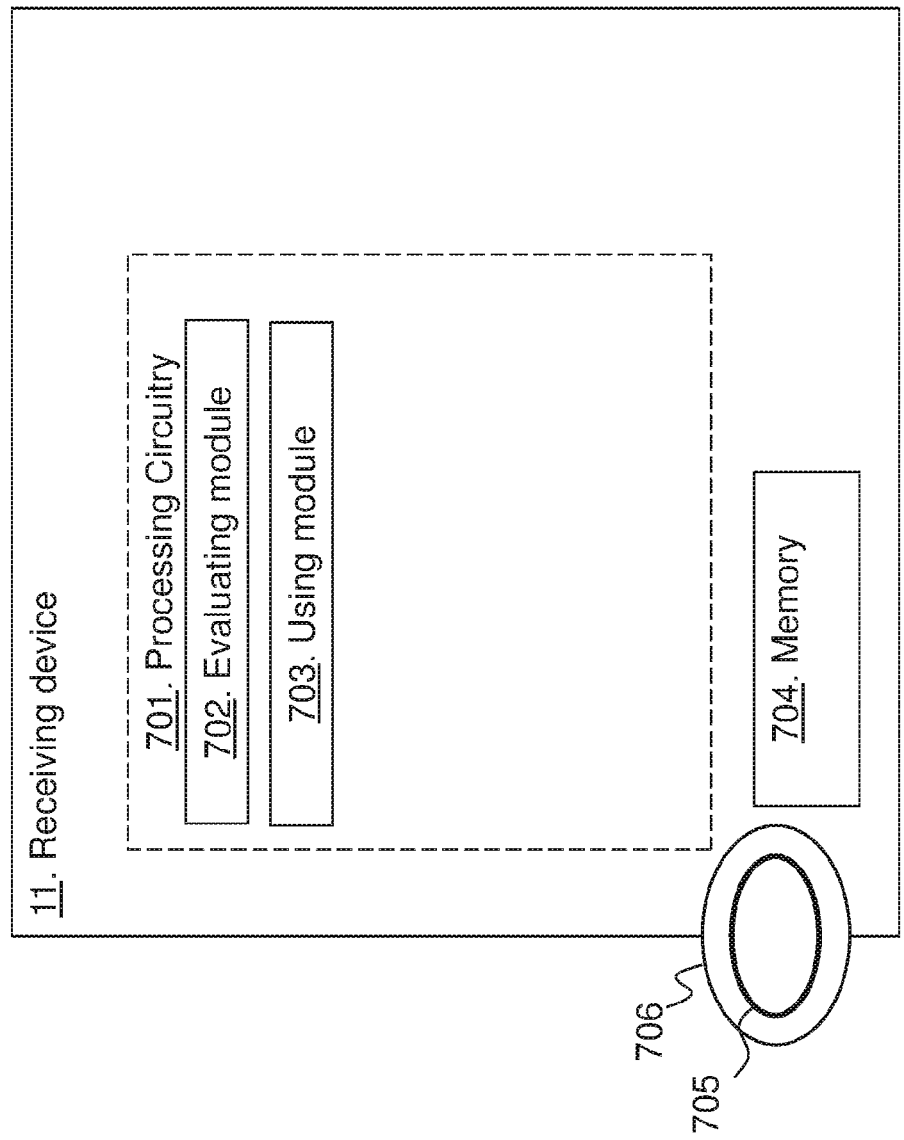

RECEIVING DEVICE AND METHOD PERFORMED THEREIN FOR COMMUNICATING IN A WIRELESS COMMUNICATION NETWORK

TECHNICAL FIELD

Embodiments herein relate to a receiving device and a method performed therein for communicating in a wireless communication network. Also a computer program for performing the method and a computer readable medium comprising a computer program for performing the method are disclosed herein.

BACKGROUND

In a typical wireless communication network, wireless devices, also known as wireless communication devices, mobile stations, stations (STA) and/or user equipments (UE), communicate via a Radio Access Network (RAN) to one or more core networks. The RAN covers a geographical area which is divided into service areas or cell areas, with each service area or cell area being served by a radio network node such as a radio access node e.g., a Wi-Fi access point or a radio base station (RBS), which in some networks may also be denoted, for example, a "NodeB" or "eNodeB". The area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs are typically connected to one or more core networks.

Specifications for the Evolved Packet System (EPS) have been completed within the $3^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access technology wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Device discovery is a well-known and widely used component of many existing wireless technologies, including ad hoc and cellular networks. Examples comprise Bluetooth and several variants of the IEEE 802.11 standards suite, such as WiFi Direct. The key technique used by these standards is to use specially designed beacon signals that devices broadcast so that nearby devices can detect the proximity of such beacon broadcasting devices. After having detected each other the devices may, if desired, initiate a communication session. This is typically done in a direct Device-to-Device (D2D) fashion, where the devices transmit data through direct signaling between each other.

During Release 12, the LTE standard has been extended with support of D2D, specified as "sidelink", features targeting both commercial and Public Safety applications. Some applications enabled by Rel-12 LTE are device discovery, where devices are able to sense the proximity of another device and associated application by broadcasting and detecting discovery messages that carry device and application identities. Another application uses direct communication based on physical channels terminated directly between devices.

One of the potential extensions for the device to device work encompasses support of a Vehicle-to-everything (V2x) communication, which V2x communication includes any combination of direct communication between vehicles, pedestrians and infrastructure. V2x communication may take advantage of a Network (NW) infrastructure, when available, but at least basic V2x connectivity should be possible even in case of lack of coverage. Providing an LTE-based V2x interface may be economically advantageous because of the LTE economies of scale and it may enable tighter integration between communications with the NW infrastructure denoted Vehicle to Infrastructure (V2I) and Vehicle to pedestrian (V2P) and Vehicle to Vehicle (V2V) communications, as compared to using a dedicated V2x technology.

V2x communications may carry both non-safety and safety information for applications and services, where each of the applications and services may be associated with specific requirements sets, e.g., in terms of latency, reliability, capacity, etc.

ETSI has defined two types of messages for road safety: Co-operative Awareness Message (CAM) and Decentralized Environmental Notification Message (DENM).

CAM: The CAM message is intended to enable vehicles, including emergency vehicles, to notify their presence and other relevant parameters in a broadcast fashion. Such messages target other vehicles, pedestrians, and infrastructure, and are handled by their applications. CAM message also serves as active assistance to safety driving for normal traffic. The availability of a CAM message is indicatively checked for every 100 ms, yielding a maximum detection latency requirement of <=100 ms for most messages. However, the latency requirement for Pre-crash sensing warning is 50 ms.

DENM: The DENM message is event-triggered, such as by braking, and the availability of a DENM message is also checked for every 100 ms, and the requirement of maximum latency is <=100 ms.

The package size of CAM and DENM message varies from 100+ to 800+ bytes and the typical size is around 300 bytes. The message is supposed to be detected by all vehicles in proximity.

The Society of the Automotive Engineers (SAE) also defines a Basic Safety Message (BSM) for Dedicated Short Range Communication (DSRC) with various message sizes defined. According to the importance and urgency of the messages, the BSMs are further classified into different priorities.

With the current D2D specifications, it is necessary to transmit a Scheduling Assignment (SA) packet prior to the transmission of the actual data packet. The SA packet comprises information that allows the receiver to find and process correctly the data packet. Moreover, the SA information also indicates to a wireless device which radio resources are being used by other wireless devices. This information can be used by the wireless device to choose radio resources for its own transmission, i.e. distributed radio resource allocation. Not detecting scheduling assignments may lead to retransmissions of packets and also failed communications resulting in a limited or poor performance of the wireless communication network.

SUMMARY

An object of embodiments herein is to provide a mechanism for improving performance of the wireless communication network in an efficient manner.

According to an aspect the object is achieved by a method performed by a receiving device for communicating in a wireless communication network. The receiving device attempts to detect a scheduling assignment from a transmitting device based on information regarding one or more radio resources previously used by the transmitting device for transmitting data to the receiving device within the wireless communication network. The receiving device assumes, when not detecting the scheduling assignment from the transmitting device, that a transmission of data from the transmitting device is scheduled on the one or more radio resources previously used by the transmitting device. The receiving device further communicates within the wireless communication network (1) based on the assumption.

According to another aspect the object is achieved by providing a receiving device for communicating in a wireless communication network. The receiving device is configured to attempt to detect a scheduling assignment from a transmitting device based on information regarding one or more radio resources previously used by the transmitting device for transmitting data to the receiving device within the wireless communication network. The receiving device is further configured to assume, when not detecting the scheduling assignment from the transmitting device, that a transmission of data from the transmitting device is scheduled on the one or more radio resources previously used by the transmitting device. The receiving device is further configured to communicate within the wireless communication network based on the assumption.

According to yet another aspect the object is achieved by providing a computer program, comprising instructions, which, when executed on at least one processor, cause the at least one processor to carry out the actions herein, as performed by the receiving device.

According to yet still another aspect the object is achieved by providing a computer-readable storage medium, having stored thereon a computer program comprising instructions which, when executed on at least one processor, cause the at least one processor to carry out the method according to the actions herein, as performed by the receiving device.

Embodiments herein assume that whenever an SA packet is missed for a recently scheduled wireless device, then it is reasonable to assume that the given wireless device is still transmitting data on its previously used radio resources. This assumption is based on the fact that most vehicular traffic is periodic and the radio resource allocations are occasionally changed. Under the proposed solution, the receiving device can correctly decode data and avoid erroneous radio resource allocation for its own transmissions, in case of missing SA data packets from one or more wireless devices in vicinity. Embodiments herein show at least two advantages: successful data reception at the receiving device is achieved even when the receiving device fails to receive a SA packet from the transmitting device; and erroneous decisions in radio resource allocation for transmissions are avoided performed by the receiving device for its own future transmissions, when the receiving device fails to receive SA packet from the transmitting device. Hence, embodiments herein provide a communication, such as V2X communication, that is robust to SA reception failures.

BRIEF DESCRIPTION OF THE DRAWINGS

Embodiments will now be described in more detail in relation to the enclosed drawings, in which:

FIG. 7 is a block diagram depicting a receiving device according to embodiments herein.

DETAILED DESCRIPTION

Figure 1:
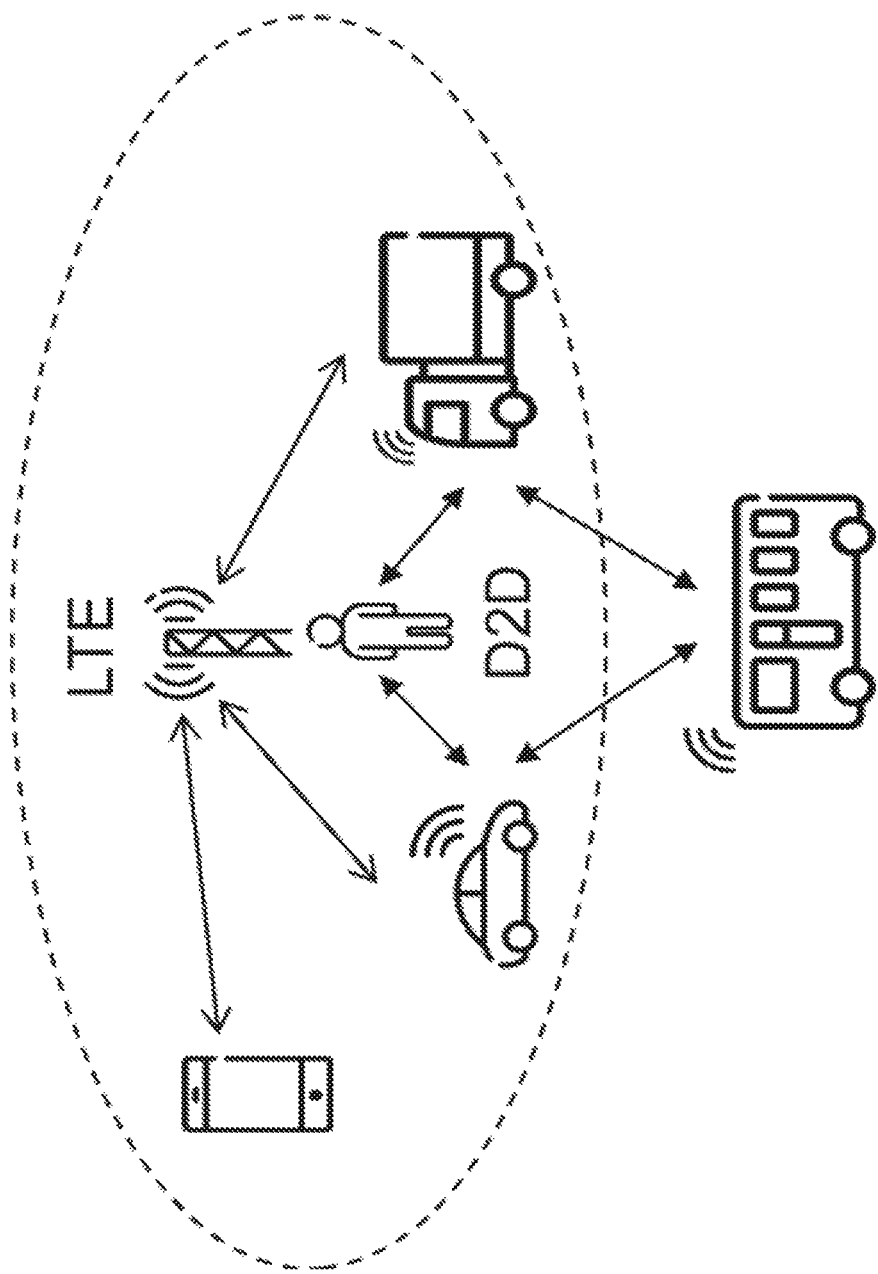
FIG. 1 is a schematic overview depicting a wireless communication network according to prior art.
Figure 2:
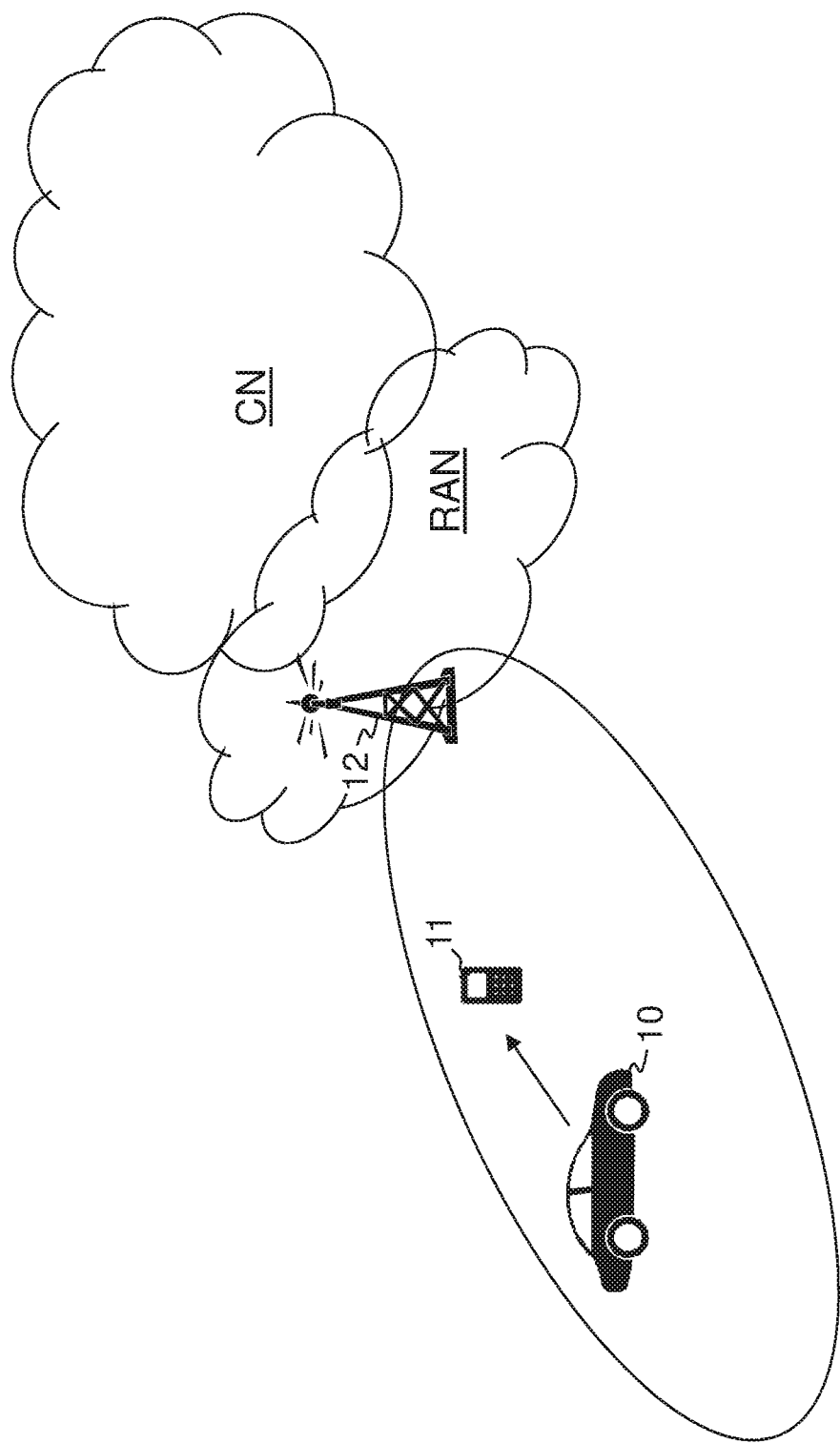
FIG. 2 is a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use a number of different technologies, such as Wi-Fi, Long Term Evolution (LTE), LTE-Advanced, Fifth Generation (5G), Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing wireless communication systems such as e.g. WCDMA and LTE.

In the wireless communication network 1, wireless devices e.g. a transmitting device 10 and a receiving device 11 such as mobile stations, vehicles, a non-access point (non-AP) STA, a STA, a user equipment and/or a wireless terminals, may communicate with one another over a device to device connection or via one or more Access Networks (AN), e.g. RAN, to one or more core networks (CN). It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell. Embodiments herein are exemplified as implemented in a wireless device but may be implemented in any radio network node or device being a device of receiving scheduling assignments.

The wireless communication network 1 comprises a radio network node 12 providing radio coverage over a geographical area, a service area or cell, of a radio access technology (RAT), such as LTE, Wi-Fi or similar. The radio network node 12 may be a radio access network node such as radio network controller or an access point such as a WLAN access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving or communicating with a wireless device within the service area 11 served by or covered by the radio network node 12 depending e.g. on the radio access technology and terminology used.

If the receiving device fails to correctly decode the SA transmission from one or more wireless devices, then there will be two major problems: The receiving device cannot decode the data packet later transmitted from these wireless devices, and the receiving device will misunderstand that certain radio resources are not being used and thus it may use those radio resources for its own transmissions and may interfere with the other wireless devices' transmissions. The two problems are associated with missing an SA packet from a transmitting device. An SA is any form of control information or scheduling information that indicates one or more radio resources scheduled for a data transmission by a transmitting device. D2D communication, such as V2X traffic, is observed to often be periodic. Scheduling occurs periodically and is valid for a certain time period called "scheduling period". Multiple scheduling periods can be scheduled consecutively and each period may span several packets transmissions. Transmitting devices are observed to typically keep the same radio resources for long time for transmission of periodic traffic and change the radio resources only occasionally. This is because radio resource allocation strategies aim at radio resource stability after convergence because resource allocation behavior for the transmitting device is repetitive. According to embodiments herein, the receiving device 11 knows which transmitting devices were scheduled during a previous scheduling period(s). Based on this information, the receiving device 11 can search for a new SA from the transmitting device 10 that were scheduled previously. If the receiving device 11 does not receive an SA packet from the previously scheduled transmitting device 10, then the receiving device 11 assumes according to embodiments herein that the previously scheduled transmitting device 10 is again scheduled on the same radio resource/s that were used by the transmitting device 10 previously. With "same radio resources" it is meant physical or logical radio resources within a periodically occurring set of radio resources, sometimes called a radio resource pool. Radio resource may be a frequency resource, a time resource or a combination thereof. Under this assumption, when the SA reception from the transmitting device 10 is missed, the receiving device 11 can still decode the data packet correctly and/or select one or more radio resources for own transmission that do not interfere with these previously scheduled radio resources. This leads to an improved performance of the wireless communication network as radio resources may still be decoded even if the SA is missed or radio resources already occupied by another device may be avoided by the receiving device 11 when transmitting data. This assumption may also be used for detecting whether the transmitting device has actually interrupted transmission or changed radio resources.

Figure 3:
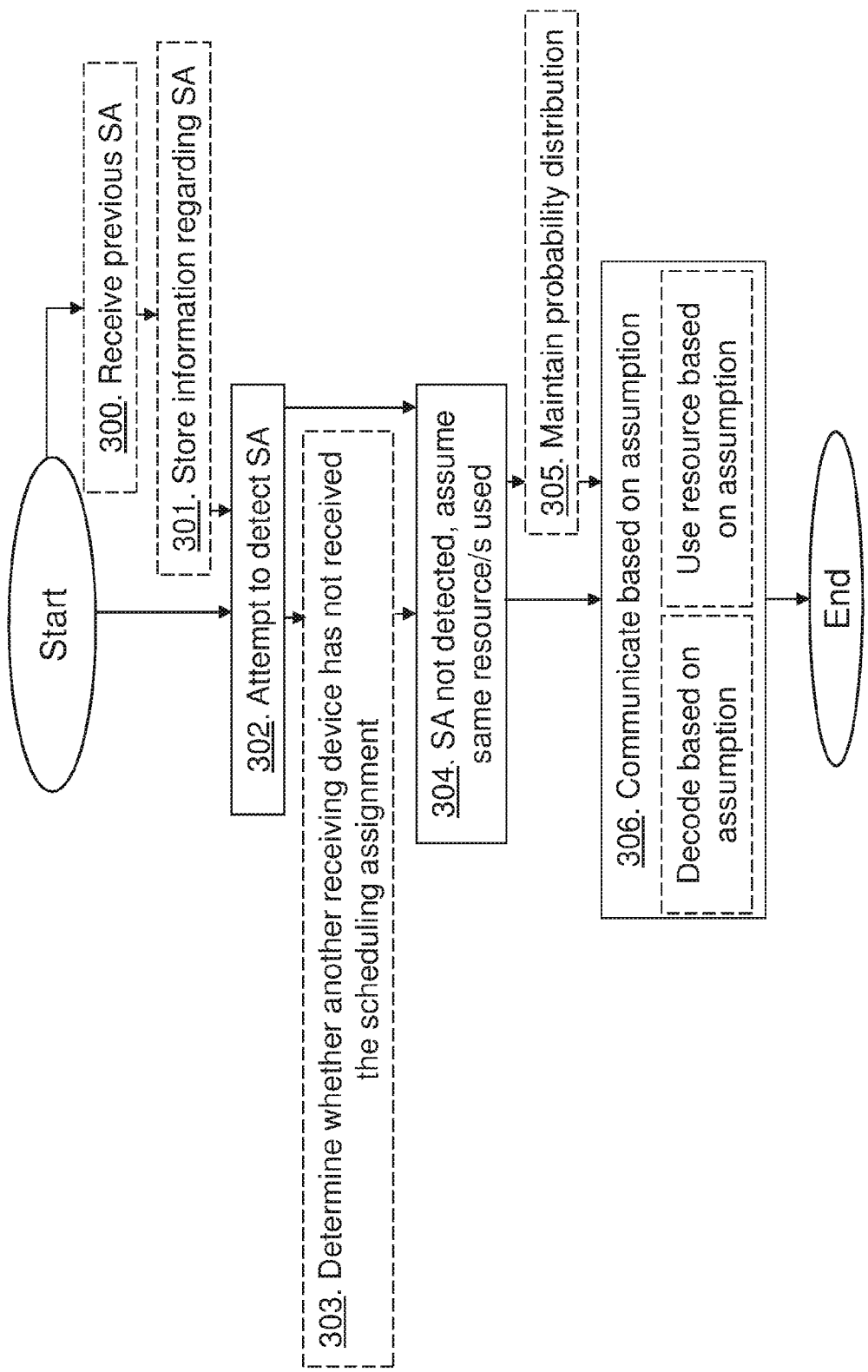
FIG. 3 is a schematic flow chart depicting a method in a receiving device according to embodiments herein.

The method actions performed by the receiving device 11 for communicating in the wireless communication network 1, e.g. over a current scheduling period, according to some embodiments will now be described with reference to a flowchart depicted in FIG. 3. The actions do not have to be taken in the order stated below, but may be taken in any suitable order. Actions performed in some embodiments, but not necessarily in all embodiments, are marked with dashed boxes. The transmission of data between the transmitting device 10 and the receiving device 11 may be performed over a connection with no feedback channel, e.g. a D2D connection.

Action 300. The receiving device 11 may receive a previous scheduling assignment, e.g. broadcasted, from the transmitting device 10. This previous scheduling assignment may be for the previous scheduling period, previous herein meaning previous to a scheduling assignment of the current scheduling period.

Action 301. The receiving device 11 may store information related to the received previous scheduling assignment. The information related to the received previous scheduling assignment defines the one or more radio resources previously used by the transmitting device 10 for the transmission of data.

Action 302. The receiving device 11 attempts to detect a scheduling assignment, e.g. for the current scheduling period, from the transmitting device 10 based on information regarding one or more radio resources previously used, e.g. used in a previous scheduling period, by the transmitting device 10 for transmitting data to the receiving device 11 within the wireless communication network. The information regarding the one or more radio resources previously used by the transmitting device 10 for transmitting data to the receiving device 11 within the wireless communication network 1 may comprise the previous scheduling assignment indicating the one or more radio resources previously used. The receiving device 11 may also know at least one radio resource carrying the previous scheduling assignment.

Action 303. The receiving device 11 may determine whether another receiving device has not received the scheduling assignment from the transmitting device 10.

Action 304. The receiving device 11, when the scheduling assignment, e.g. for the current scheduling period, from the transmitting device 10 is not detected, assumes that a transmission of data from the transmitting device 10 is scheduled on the one or more radio resources previously used by the transmitting device 10.

The receiving device 11 may base the assumption on a first counter counting a first number of times the transmitting device 10 is repeatedly scheduled for transmission on the one or more radio resources. The receiving device 11 may additionally or alternatively base the assumption on a second counter counting a second number of times a scheduling assignment for the transmitting device is missed at the receiving device 11. The receiving device 11 may, when assuming that a transmission of data from the transmitting device 10 is scheduled on the one or more radio resources, rank in probability the one or more radio resources based on a first value of the first counter and/or a second value of the second counter, and a predefined rule such that a ranked radio resource that has a highest rank is assumed to be used for transmission by the transmitting device 10. The first value may correspond to the first number of time of the first counter, i.e. how many times have the transmitting device 10 been repeatedly scheduled for transmission on the one or more radio resources. The second value may correspond to the second number of the second counter, i.e. how many times have the transmitting device 10 have a scheduling assignment for the transmitting device been missed at the receiving device 11. The receiving device 11 may alternatively, when assuming that a transmission of data from the transmitting device 10 is scheduled on the one or more radio resources, rank in probability the one or more radio resources based on the first value of the first counter and/or the second value of the second counter and thresholds associated with the first and second values such that a ranked radio resource that has a highest rank is assumed to be used for transmission by the transmitting device 10. For example, the receiving device 11 may maintain two counters: i) the first counter that counts the number of times the transmitting device 10 is repeatedly or consecutively scheduled on a given radio resource, ii) the second counter, that counts the number of times the SA reception is missed related to the transmitting device 10 that was being scheduled previously. Now, in case of missing an SA packet from the recently scheduled transmitting device 10, the receiving device 11 can decide based on the first counter and the second counter whether it is a valid assumption that the transmitting device 10 has transmitted data on previously used radio resources. Whether to assume that the same radio resource is used or not may alternatively be based merely on the second counter and an associated threshold, where the threshold is defined as: A maximum number of scheduling periods that the receiving device 11 can assume that the given transmitting device 10 is scheduled on t its previously used radio resources in case of missing the SA packet from the given transmitting device 10. In this case, if the value of the second counter exceeds the associated threshold, then the receiving device 11 assumes that the given transmitting device 10 is not being scheduled anymore. For example a low second value indicates a higher ranked radio resource as low number of missed SAs indicates that the transmitting device 10 will use the same radio resources but any combination of the first and second values may indicate a higher ranked radio resource. Higher ranked meaning more likely to be used by the transmitting device 10.

The receiving device may also base the assumption on whether it is determined in action 303 that another receiving device has not received the scheduling assignment. The receiving device 11 may e.g. consider whether a second transmitting device is now scheduled on those radio resources that were previously allocated to the transmitting device 10 from which the SA is missed in the current scheduling period and stop attempting detection of data from the transmitting device 10 on such radio resources. In other words, transmission of data by another transmitting device on the same radio resources indicate that other receiving devices may also not have received the SA packet from the given transmitting device 10. When two or more receiving devices miss an SA packet from the transmitting device 10, it means that it is more likely that the transmitting device 10 has stopped transmission or has moved out of coverage. So, in this case the assumption that the transmitting device 10 is still transmitting on the same radio resource can become less reliable.

Action 305. The receiving device 11 may maintain a probability distribution for selection of one or more radio resources for communication, which probability distribution is taking the assumption into account.

Action 306. The receiving device 11 communicates within the wireless communication network 1 based on the assumption.

The receiving device 11 may communicate within the wireless communication network 1 by attempting to decode the assumed transmission of data from the transmitting device 10 based on the assumption. Hence, the receiving device tries to decode a transmission on the one or more radio resources previously used by the transmitting device 10.

Additionally or alternatively, the receiving device 11 may communicate within the wireless communication network 1 by scheduling a transmission of data from the receiving device 11 on a radio resource selected based on the assumption. For example, one or more radio resources used by the transmitting device 10 in the previous scheduling period may be avoided when scheduling the transmission of data from the receiving device 11 in the current scheduling period. According to some embodiments herein, the receiving device 11 may, under the assumption that the one or more radio resources are still used by the transmitting device 10, avoid using the one or more radio resources previously used by the transmitting device when communicating, i.e. transmitting, within the wireless communication network 1. The receiving device 11 may alternatively or additionally e.g. select radio resources for communication using the maintained probability distribution.

Figure 4:
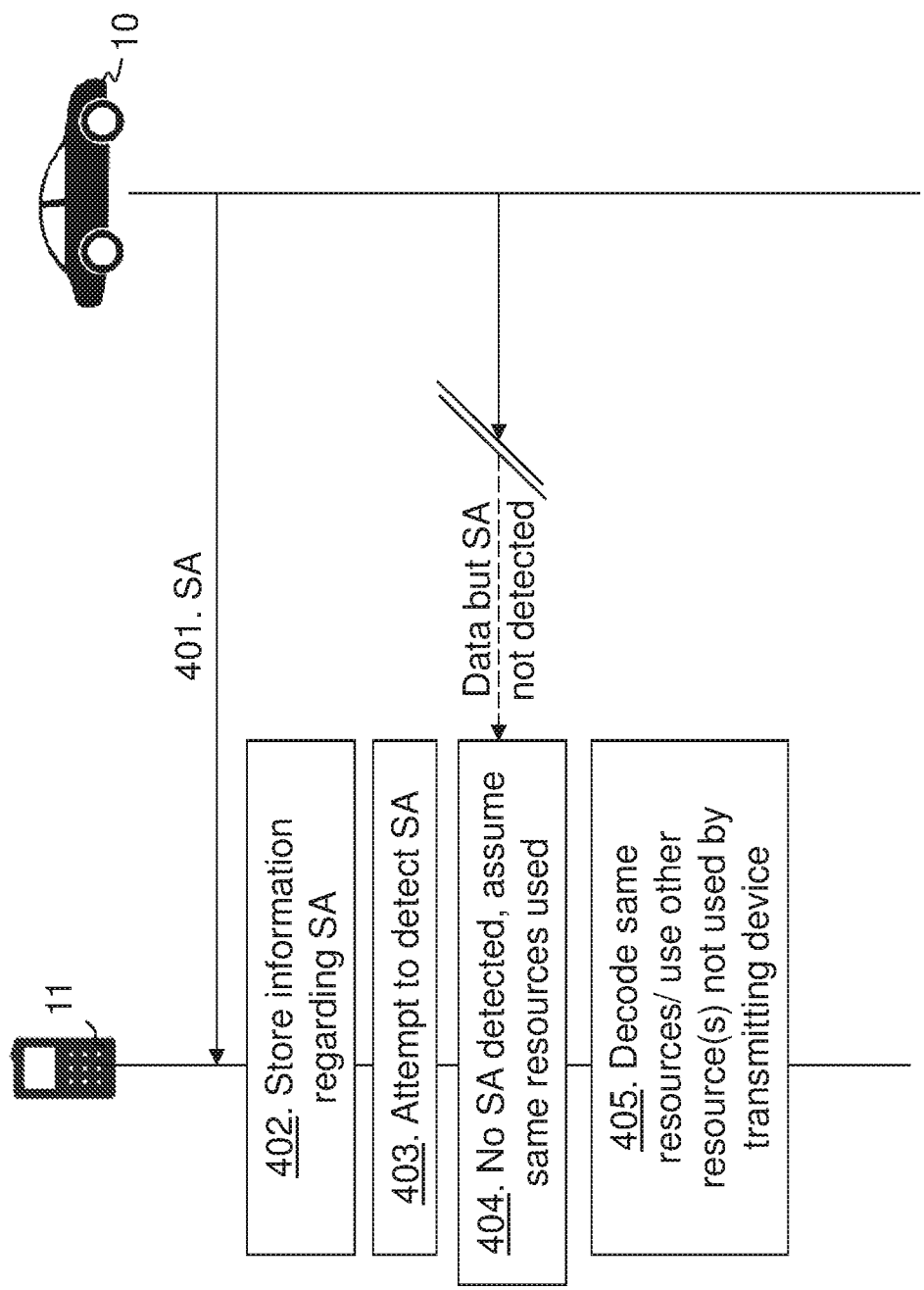
FIG. 4 is a combined signalling scheme and flowchart according to embodiments herein.

FIG. 4 is a combined flowchart and signaling scheme depicting embodiments herein.

Action 401. The transmitting device 10 may transmit a first scheduling assignment, also referred to as previous scheduling assignment, e.g. broadcasted from the transmitting device 10.

Action 402. The receiving device 11 receives the first scheduling assignment and stores the information associated with the received first scheduling assignment. Hence, the receiving device 11 knows or has information on which transmitting devices were scheduled during the previous scheduling period(s). E.g. the receiving device 11 has knowledge regarding one or more radio resources previously assigned to the transmitting device 10 for communicating over a D2D connection with the receiving device 11.

Action 403. Based on this information, the receiving device 11 can search for a new SA from a transmitting device that was scheduled previously. That is, the receiving device 11 attempts to detect a scheduling assignment from the transmitting device 10 based on the information regarding one or more radio resources previously used by the transmitting device 10 for transmitting data to the receiving device 11 within the wireless communication network 1.

Action 404. When not detecting the scheduling assignment from the transmitting device 10, the receiving device 11 assumes that the transmission of data from the transmitting device 10 is scheduled on the one or more radio resources previously used by the transmitting device 10. Hence, if the receiving device 11 does not receive an SA packet from the previously scheduled transmitting device 10, then the receiving device 11 assumes that the previously scheduled transmitting device(s) 10 is again scheduled on the same radio resources that were used by it previously.

Action 405. The receiving device 11 may under this assumption, when the SA reception from the transmitting device 10 is missed, attempt to decode the data over the one or more radio resources or refrain from selecting the one or more radio resources for its own transmission.

Figure 5:
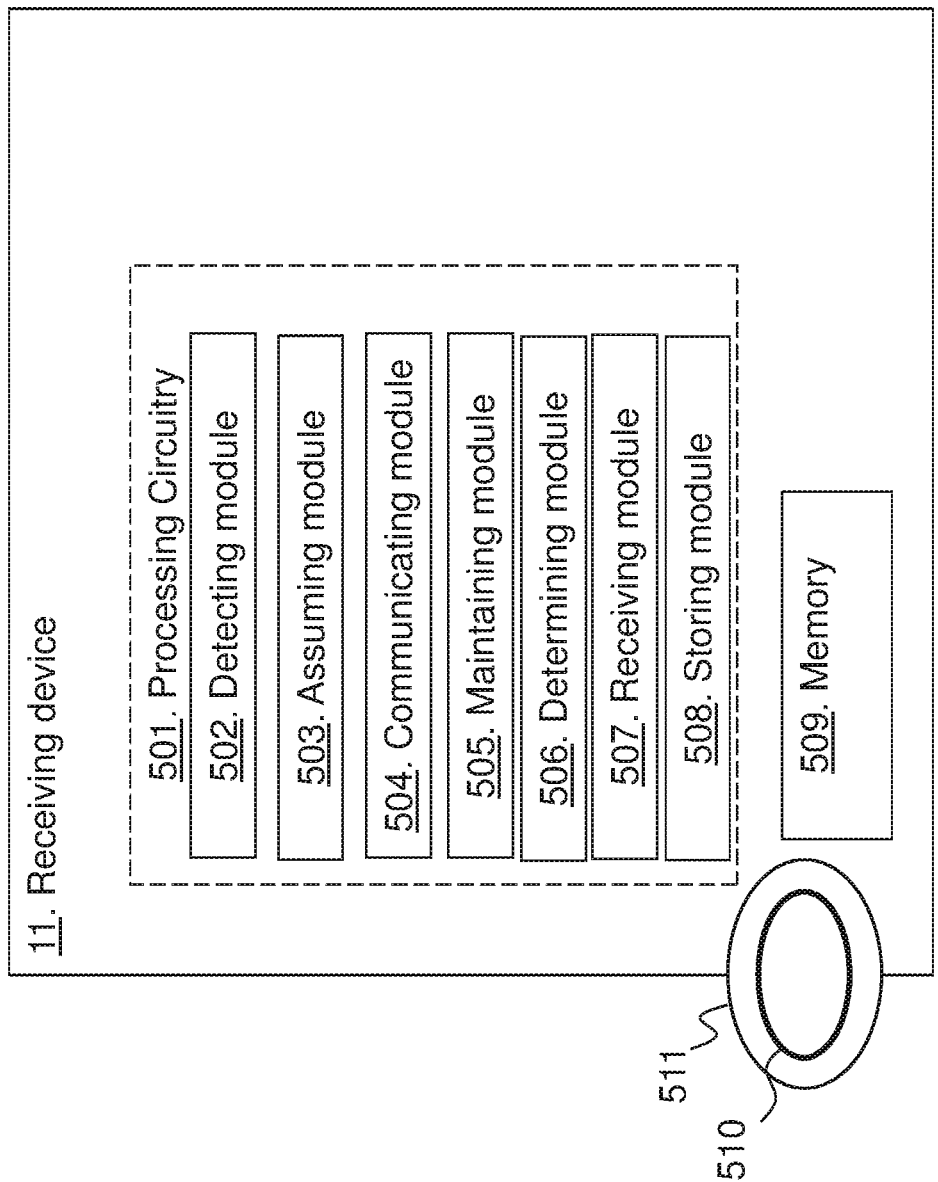
FIG. 5 is a block diagram depicting a receiving device according to embodiments herein.

In order to perform the methods herein a receiving device 11 is provided. FIG. 5 shows the receiving device 11 for communicating in the wireless communication network 1.

The receiving device 11 is configured to attempt to detect a scheduling assignment from a transmitting device 10 based on information regarding one or more radio resources previously used by the transmitting device 10 for transmitting data to the receiving device 11 within the wireless communication network 1. The information regarding the one or more radio resources previously used by the transmitting device 10 for transmitting data to the receiving device 11 within the wireless communication network 1 may comprise the previous scheduling assignment. The transmission of data between the transmitting device 10 and the receiving device 11 may be performed over the connection with no feedback channel, e.g. a D2D connection.

The receiving device 11 is further configured to assume, when not detecting the scheduling assignment from the transmitting device 10, that a transmission of data from the transmitting device 10 is scheduled on the one or more radio resources previously used by the transmitting device 10. The receiving device 11 may further be configured to assume that the transmission of data from the transmitting device 10 is scheduled on the one or more radio resources previously used by the transmitting device 10 based on the first counter counting the first number of times the transmitting device 10 is repeatedly scheduled for transmission on the one or more radio resources. Alternatively or additionally, the receiving device 11 may be configured to assume that the transmission of data from the transmitting device 10 is scheduled on the one or more radio resources previously used by the transmitting device 10 based on the second counter counting the second number of times a scheduling assignment for the transmitting device is missed at the receiving device 11. The receiving device 11 may be configured to assume that the transmission of data from the transmitting device 10 is scheduled on the one or more radio resources previously used by the transmitting device 10 by being configured to rank in probability the one or more radio resources based on the first value, i.e. the first number, of the first counter and/or the second value, i.e. the second number, of the second counter, and a predefined rule, such that a ranked radio resource that has a highest rank is assumed to be used for transmission by the transmitting device 10. Alternatively, the receiving device 11 may be configured to assume that the transmission of data from the transmitting device 10 is scheduled on the one or more radio resources previously used by the transmitting device 10 by being configured to rank in probability the one or more radio resources based on the first value of the first counter and/or the second value of the second counter, and thresholds associated with the first and second values, such that a ranked radio resource that has a highest rank is assumed to be used for transmission by the transmitting device 10. The receiving device 11 may e.g. be configured to decide based on the first counter and the second counter whether it is a valid assumption that the transmitting device 10 is still transmitting data on its previously used radio resources. In some embodiments, when the value of the second counter exceeds the associated threshold, then the receiving device 11 may be configured to assume that the transmitting device 10 is not using the one or more radio resources anymore.

The receiving device 11 is also configured to communicate within the wireless communication network 1 based on the assumption. The receiving device 11 may be configured to communicate within the wireless communication network 1 by being configured to attempt to decode the assumed transmission of data from the transmitting device 10 based on the assumption. The receiving device 11 may be configured to communicate within the wireless communication network by being configured to schedule a transmission of data from the receiving device 11 on a radio resource selected based on the assumption. The receiving device 11 may thus be configured to avoid using the one or more radio resources previously used by the transmitting device, e.g. during the previous scheduling period, when transmitting data e.g. during the current scheduling period.

The receiving device 11 may further be configured to maintain the probability distribution for selection of one or more radio resources for communication, which probability distribution is taking the assumption into account. Hence, each receiving device may maintain a respective probability distribution for selection of radio resources for its transmission, where for each radio resource there is an associated probability for its selection by the respective receiving device. In this case, the probability to select a certain radio resource reflects the receiving device's 11 belief that the given radio resource is not occupied. And this belief can be based on the assumption that missing an SA packet for one or more consecutive transmissions is most likely due to SA reception failure.

The receiving device 11 may further be configured to determine whether another receiving device has not received the scheduling assignment from the transmitting device 10. And then, the receiving device 11 may be configured to assume that the transmission of data from the transmitting device 10 is scheduled on the one or more radio resources previously used by the transmitting device 10 based on whether it is determined that the other receiving device has not received the scheduling assignment. Hence, the receiving device 11 may be configured to also take into consideration if some other transmitting device is now scheduled on those radio resources that were previously allocated to the transmitting device 10 from which the SA is missed in the current scheduling period. For example, a transmission of packets from other transmitting devices over the same radio resources indicates that other transmitting devices may also not have received the SA packet from the transmitting device 10. When a certain number of receiving device, e.g. two or more receiving devices, misses an SA packet from the transmitting device 10, then it is more likely that the transmitting device 10 has stopped transmission or has moved out of coverage. Therefore, in this case the assumption that the transmitting device 10 is still transmitting on the same radio resource can be been as less reliable. And hence, the receiving device 11 can choose its own radio resource for communication based on this information.

The receiving device 11 may also be configured to receive or have received, e.g. for the previous scheduling period, the previous scheduling assignment e.g. broadcasted from the transmitting device 10. Furthermore, the receiving device 11 may be configured to store information related to the received previous scheduling assignment. The information related to the received previous scheduling assignment defines the one or more radio resources previously used by the transmitting device 10 for the transmission of data.

The receiving device 11 may comprise processing circuitry 501 configured to perform the methods herein. The receiving device 11 may comprise a detecting module 502. The processing circuitry 501 and/or the detecting module 502 may be configured to attempt to detect a scheduling assignment from a transmitting device 10 based on information regarding one or more radio resources previously used by the transmitting device 10 for transmitting data to the receiving device 11 within the wireless communication network 1.

The receiving device 11 may comprise an assuming module 503. The processing circuitry 501 and/or the assuming module 503 may be configured to assume, when not detecting the scheduling assignment from the transmitting device 10, that a transmission of data from the transmitting device 10 is scheduled on the one or more radio resources previously used by the transmitting device 10. The processing circuitry 501 and/or the assuming module 503 may be configured to assume that the transmission of data from the transmitting device 10 is scheduled on the one or more radio resources previously used by the transmitting device 10 based on the first counter counting the first number of times the transmitting device 10 is repeatedly scheduled for transmission on the one or more radio resources. Alternatively or additionally, the processing circuitry 501 and/or the assuming module 503 may be configured to assume that the transmission of data from the transmitting device 10 is scheduled on the one or more radio resources previously used by the transmitting device 10 based on the second counter counting the second number of times a scheduling assignment for the transmitting device is missed at the receiving device 11. The processing circuitry 501 and/or the assuming module 503 may be configured to assume that the transmission of data from the transmitting device 10 is scheduled on the one or more radio resources previously used by the transmitting device 10 by being configured to rank in probability the one or more radio resources based on the first value of the first counter and/or the second value of the second counter, and a predefined rule, or thresholds associated with the first and second values, such that a ranked radio resource that has a highest rank is assumed to be used for transmission by the transmitting device 10.

The receiving device 11 may comprise a communicating module 504. The processing circuitry 501 and/or the communicating module 504 may be configured to communicate within the wireless communication network 1 based on the assumption. The processing circuitry 501 and/or the communicating module 504 may be configured to communicate within the wireless communication network 1 by being configured to attempt to decode the assumed transmission of data from the transmitting device 10 based on the assumption. The processing circuitry 501 and/or the communicating module 504 may be configured to communicate within the wireless communication network by being configured to schedule a transmission of data from the receiving device 11 on a radio resource selected based on the assumption. The processing circuitry 501 and/or the communicating module 504 may be configured to avoid, during transmission, using the one or more radio resources previously used by the transmitting device, e.g. during the previous scheduling period, when transmitting data e.g. during the current scheduling period.

The receiving device 11 may comprise a maintaining module 505. The processing circuitry 501 and/or the maintaining module 505 may be configured to maintain the probability distribution for selection of one or more radio resources for communication, which probability distribution is taking the assumption that a transmission of data from the transmitting device 10 is scheduled on the one or more radio resources into account.

The receiving device 11 may comprise a determining module 506. The processing circuitry 501 and/or the determining module 506 may be configured to determine whether another receiving device has not received the scheduling assignment from the transmitting device 10. And then, processing circuitry 501 and/or the assuming module 503 may be configured to assume that the transmission of data from the transmitting device 10 is scheduled on the one or more radio resources previously used by the transmitting device 10 based on whether it is determined that the other receiving device has not received the scheduling assignment.

The receiving device 11 may comprise a receiving module 507. The processing circuitry 501 and/or the receiving module 507 may be configured to receive the previous scheduling assignment, e.g. broadcasted, from the transmitting device 10.

Furthermore, the receiving device 11 may comprise a storing module 508. The processing circuitry 501 and/or the storing module 508 may be configured to store information related to the received previous scheduling assignment, wherein the information related to the received previous scheduling assignment defines the one or more radio resources previously used by the transmitting device 10 for the transmission of data.

The receiving device 11 further comprises a memory 509. The memory comprises one or more units to be used to store data on, such as thresholds, SA, information regarding radio resource usage, scheduling periods, applications to perform the methods disclosed herein when being executed, and similar.

The methods according to the embodiments described herein for the receiving device 11 are implemented by means of e.g. a computer program 510 or a computer program product, comprising instructions, i.e., software code portions, which, when executed on at least one processor, cause the at least one processor to carry out the actions described herein, as performed by the receiving device 11. The computer program 510 may be stored on a computer-readable storage medium 511, e.g. a disc or similar. The computer-readable storage medium 511, having stored thereon the computer program, may comprise the instructions which, when executed on at least one processor, cause the at least one processor to carry out the actions described herein, as performed by the receiving device 11. In some embodiments, the computer-readable storage medium 511 may be a non-transitory computer-readable storage medium.

Figure 6:
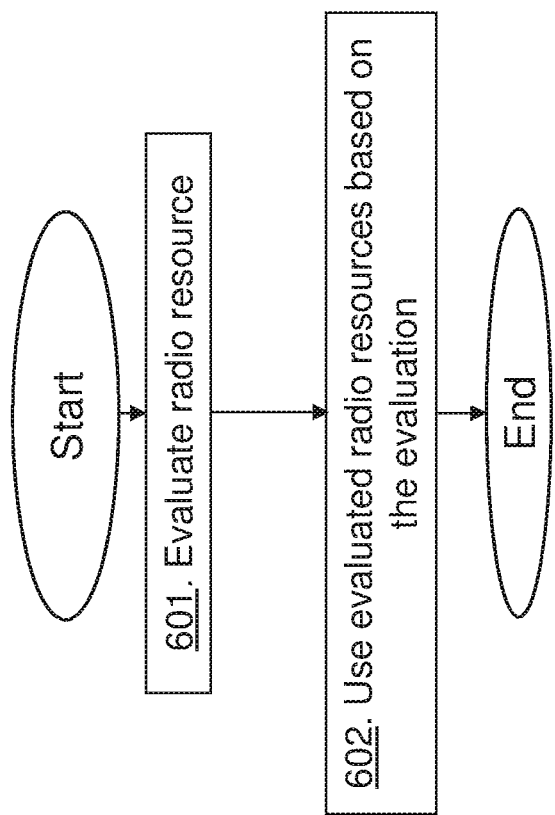
FIG. 6 is a combined signalling scheme and flowchart according to embodiments herein.

FIG. 6 shows a flowchart depicting a method performed in the receiving device 11 for communicating in the wireless communication network 1.

Action 601. The receiving device 11 evaluates a radio resource for communication based on historical data regarding one or more radio resources previously used by the transmitting device 10 for transmitting data to the receiving device 11 within the wireless communication network, Action 602. The receiving device 11 uses the evaluated radio resource for a transmission of data based on the evaluation. Thus, a transmission of data from the receiving device 11 is scheduled on a radio resource selected based on the evaluation. The receiving device 11 may maintain a probability distribution for selection of one or more radio resources for communication, which probability distribution is taking the evaluation into account. The evaluation may be based on the first counter counting the first number of times the transmitting device 10 is repeatedly scheduled for transmission on the one or more radio resources. The evaluation may be based on the second counter counting the second number of times a scheduling assignment for the transmitting device is missed at the receiving device 11. The evaluation may comprise ranking in probability of the one or more radio resources based on the first value, being the first number, of the first counter and/or the second value, being the second number, of the second counter, and a predefined rule, such that a ranked radio resource that has a highest rank is assumed to be used for transmission by the transmitting device 10. Alternatively, the evaluation may comprise ranking in probability the one or more radio resources based on the first value of the first counter and/or the second value of the second counter and thresholds associated with the first and second values, such that a ranked radio resource that has a highest rank is assumed to be used for transmission by the transmitting device 10. The evaluation may be performed based on whether another receiving device has not received the scheduling assignment from the transmitting device 10.

FIG. 7 is a block diagram depicting the receiving device 11 according to some embodiments for communicating in the wireless communication network 1. The receiving device 11 is configured to evaluate the radio resource for communication based on historical data regarding one or more radio resources previously used by the transmitting device 10 for transmitting data to the receiving device 11 within the wireless communication network 1. The receiving device 11 is configured to use the evaluated radio resource for a transmission of data based on the evaluation. Thus the receiving device may comprise processing circuitry 701, an evaluating module 702 and/or a using module 703.

The processing circuitry and/or the evaluating module 702 may be configured to evaluate the radio resource for communication based on historical data regarding one or more radio resources previously used by the transmitting device 10 for transmitting data to the receiving device 11 within the wireless communication network 1.

The processing circuitry and/or the using module 703 may be configured to use the evaluated radio resource for a transmission of data based on the evaluation.

The receiving device 11 further comprises a memory 704. The memory comprises one or more units to be used to store data on, such as thresholds, SA, information regarding radio resource usage, scheduling periods, applications to perform the methods disclosed herein when being executed, and similar.

The methods according to the embodiments described herein for the receiving device 11 are implemented by means of e.g. a computer program 705 or a computer program product, comprising instructions, i.e., software code portions, which, when executed on at least one processor, cause the at least one processor to carry out the actions described herein, as performed by the receiving device 11. The computer program 705 may be stored on a computer-readable storage medium 706, e.g. a disc or similar. The computer-readable storage medium 706, having stored thereon the computer program, may comprise the instructions which, when executed on at least one processor, cause the at least one processor to carry out the actions described herein, as performed by the receiving device 11. In some embodiments, the computer-readable storage medium 706 may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a receiving device, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a receiving device for communicating in a wireless communication network, the method comprising:
   attempting to detect a scheduling assignment from a transmitting device based on information regarding one or more radio resources previously used by the transmitting device for transmitting data to the receiving device within the wireless communication network;
   when the scheduling assignment from the transmitting device is not detected, assuming that a transmission of data from the transmitting device is scheduled on the one or more radio resources previously used by the transmitting device; and
   communicating within the wireless communication network based on the assumption.

2. The method according to claim 1, wherein the communicating comprises attempting to decode the assumed transmission of data from the transmitting device based on the assumption.

3. The method according to claim 1, wherein the communicating comprises scheduling a transmission of data from the receiving device on a radio resource selected based on the assumption.

4. The method according to claim 1, further comprising maintaining a probability distribution for selection of one or more radio resources for communication, which probability distribution is taking the assumption into account.

5. The method according to claim 1, wherein the assuming is performed based on a first counter counting a first number of times the transmitting device is repeatedly scheduled for transmission on the one or more radio resources.

6. The method according to claim 1, further comprising determining whether another receiving device has not received the scheduling assignment from the transmitting device, and wherein the assuming is performed also based on whether it is determined that the other receiving device has not received the scheduling assignment.

7. The method according to claim 1, further comprising receiving a previous scheduling assignment from the transmitting device; and
   storing information related to the received previous scheduling assignment, wherein the information related to the received previous scheduling assignment defines the one or more radio resources previously used by the transmitting device for the transmission of data.

8. The method according to claim 1, wherein the information regarding the one or more radio resources previously used by the transmitting device for transmitting data to the receiving device within the wireless communication network comprises a previous scheduling assignment.

9. The method according to claim 1, wherein the transmission of data between the transmitting device and the receiving device is performed over a connection with no feedback channel.

10. A receiving device for communicating in a wireless communication network, the receiving device comprising:
  at least one processor; and
  at least one computer-readable medium comprising instructions that, when executed by the at least one processor, configure the receiving device to:
    attempt to detect a scheduling assignment from a transmitting device based on information regarding one or more radio resources previously used by the transmitting device for transmitting data to the receiving device within the wireless communication network;
    assume, when the scheduling assignment from the transmitting device is not detected, that a transmission of data from the transmitting device is scheduled on the one or more radio resources previously used by the transmitting device; and
    communicate within the wireless communication network based on the assumption.

11. The receiving device according to claim 10, wherein the instructions configure the receiving device to communicate within the wireless communication network by attempting to decode the assumed transmission of data from the transmitting device based on the assumption.

12. The receiving device according to claim 10, wherein the instructions configure the receiving device to communicate within the wireless communication network by scheduling a transmission of data from the receiving device on a radio resource selected based on the assumption.

13. The receiving device according to claim 10, wherein the at least one memory further comprises instructions that, when executed by the at least one processor, configure the receiving device to maintain a probability distribution, based on the assumption, for selection of one or more radio resources for communication.

14. The receiving device according to claim 10, wherein the instructions configure the receiving device to assume that the transmission of data from the transmitting device is scheduled on the one or more radio resources previously used by the transmitting device based on a first counter counting a first number of times the transmitting device is repeatedly scheduled for transmission on the one or more radio resources.

15. The receiving device according to claim 10, wherein the at least one memory further comprises instructions that, when executed by the at least one processor, configure the receiving device to:
  determine whether another receiving device has not received the scheduling assignment from the transmitting device, and
  to assume that the transmission of data from the transmitting device is scheduled on the one or more radio resources previously used by the transmitting device based on whether it is determined that the other receiving device has not received the scheduling assignment.

16. The receiving device according to claim 10, wherein the at least one memory further comprises instructions that, when executed by the at least one processor, configure the receiving device to:
  receive a previous scheduling assignment from the transmitting device; and
  store information related to the received previous scheduling assignment, wherein the information related to the received previous scheduling assignment defines the one or more radio resources previously used by the transmitting device for the transmission of data.

17. The receiving device according to claim 10, wherein the information regarding the one or more radio resources previously used by the transmitting device for transmitting data to the receiving device within the wireless communication network comprises a previous scheduling assignment.

18. The receiving device according to claim 10, wherein the transmission of data between the transmitting device and the receiving device is performed over a connection with no feedback channel.

19. A non-transitory computer-readable storage medium storing a computer program comprising program instructions that, when executed by a processing circuit of a receiving device configured for operation in a wireless communication network, configures the receiving device to:
  attempt to detect a scheduling assignment from a transmitting device based on information regarding one or more radio resources previously used by the transmitting device for transmitting data to the receiving device within the wireless communication network;
  assume, when the scheduling assignment from the transmitting device is not detected, that a transmission of data from the transmitting device is scheduled on the one or more radio resources previously used by the transmitting device; and to
  communicate within the wireless communication network based on the assumption.

20. The method according to claim 5, wherein the assuming is performed based on a second counter counting a second number of times a scheduling assignment for the transmitting device is missed at the receiving device.

21. The method according to claim 20, wherein the assuming comprises ranking in probability the one or more radio resources based on a first value of the first counter and/or a second value of the second counter, and a predefined rule, such that a ranked radio resource that has a highest rank is assumed to be used for transmission by the transmitting device.

22. The method according to claim 20, wherein the assuming comprises ranking in probability the one or more radio resources based on a first value of the first counter and/or a second value of the second counter and thresholds associated with the first and second values, such that a ranked radio resource that has a highest rank is assumed to be used for transmission by the transmitting device.

23. The receiving device according to claim 14, wherein the instructions configure the receiving device to assume that the transmission of data from the transmitting device is scheduled on the one or more radio resources previously used by the transmitting device based on a second counter counting a second number of times a scheduling assignment for the transmitting device is missed at the receiving device.

24. The receiving device according to claim 23, wherein the instructions configure the receiving device to assume that the transmission of data from the transmitting device is scheduled on the one or more radio resources previously used by the transmitting device by being configured to rank in probability the one or more radio resources based on a first value of the first counter and/or a second value of the second counter, and a predefined rule, such that a ranked radio resource that has a highest rank is assumed to be used for transmission by the transmitting device.

25. The receiving device according to claim 23, wherein the instructions configure the receiving device to assume that the transmission of data from the transmitting device is scheduled on the one or more radio resources previously used by the transmitting device by being configured to rank in probability the one or more radio resources based on a first value of the first counter and/or a second value of the second counter, and thresholds associated with the first and second values, such that a ranked radio resource that has a highest rank is assumed to be used for transmission by the transmitting device.

* * * * *